United States Patent [19]

Shefsky

[11] Patent Number: 5,065,139
[45] Date of Patent: Nov. 12, 1991

[54] PORTABLE LEVEL SENSING APPARATUS

[76] Inventor: Joseph Shefsky, 3950 S. Inwood Ave., New Orleans, La. 70131

[21] Appl. No.: 527,083

[22] Filed: May 22, 1990

[51] Int. Cl.$^5$ .............................................. G08B 21/00
[52] U.S. Cl. .................................. 340/620; 340/618; 324/662; 361/284
[58] Field of Search ................ 340/618, 620; 324/661, 324/662; 73/304 C; 361/284; 33/716, 723; 318/482

[56] References Cited

U.S. PATENT DOCUMENTS

| | | | |
|---|---|---|---|
| 2,691,223 | 10/1954 | Oberlin | 33/126.7 |
| 2,698,539 | 1/1955 | Gridel et al. | 73/304 |
| 2,997,878 | 8/1961 | Graham | 73/304 |
| 3,485,262 | 12/1969 | Perren | 137/386 |
| 3,675,614 | 7/1972 | Ward et al. | 116/118 |
| 3,704,724 | 12/1972 | Holbrook et al. | 137/392 |
| 3,909,948 | 10/1975 | Markfelt | 33/126.5 |
| 4,123,753 | 10/1978 | Gravert | 340/621 |
| 4,126,857 | 11/1978 | Lancia et al. | 340/605 |
| 4,227,190 | 10/1980 | Kelley et al. | 340/604 |
| 4,231,025 | 10/1980 | Turner, Jr. | 340/521 |
| 4,279,078 | 7/1981 | Hinshaw et al. | 33/126.5 |
| 4,540,976 | 9/1985 | Wegrzyn | 340/539 |
| 4,780,705 | 10/1988 | Beane | 340/620 |

Primary Examiner—Jin F. Ng
Assistant Examiner—Jeffery A. Hofsass
Attorney, Agent, or Firm—Pravel, Gambrell, Hewitt, Kimball & Krieger

[57] ABSTRACT

A portable level sensing device includes an audible alarm and a visual alarm (preferably LEDs) for signalling when a predetermined level has been sensed by a capacitance proximity switch. The device is designed for use in tank cars, ships, barges, and tank trucks, and includes a graduated rod and a threaded coupling to allow one to quickly and easily set the capacitance proximity switch at the proper level in a tank. The device includes an weather-tight housing and is intrinsically safe for use in hazardous area classifications Class I, Division 1, Groups A, B, C, & D. The device can be coupled in a pressuretight manner to the tank to prevent the escape of fumes during use.

23 Claims, 4 Drawing Sheets

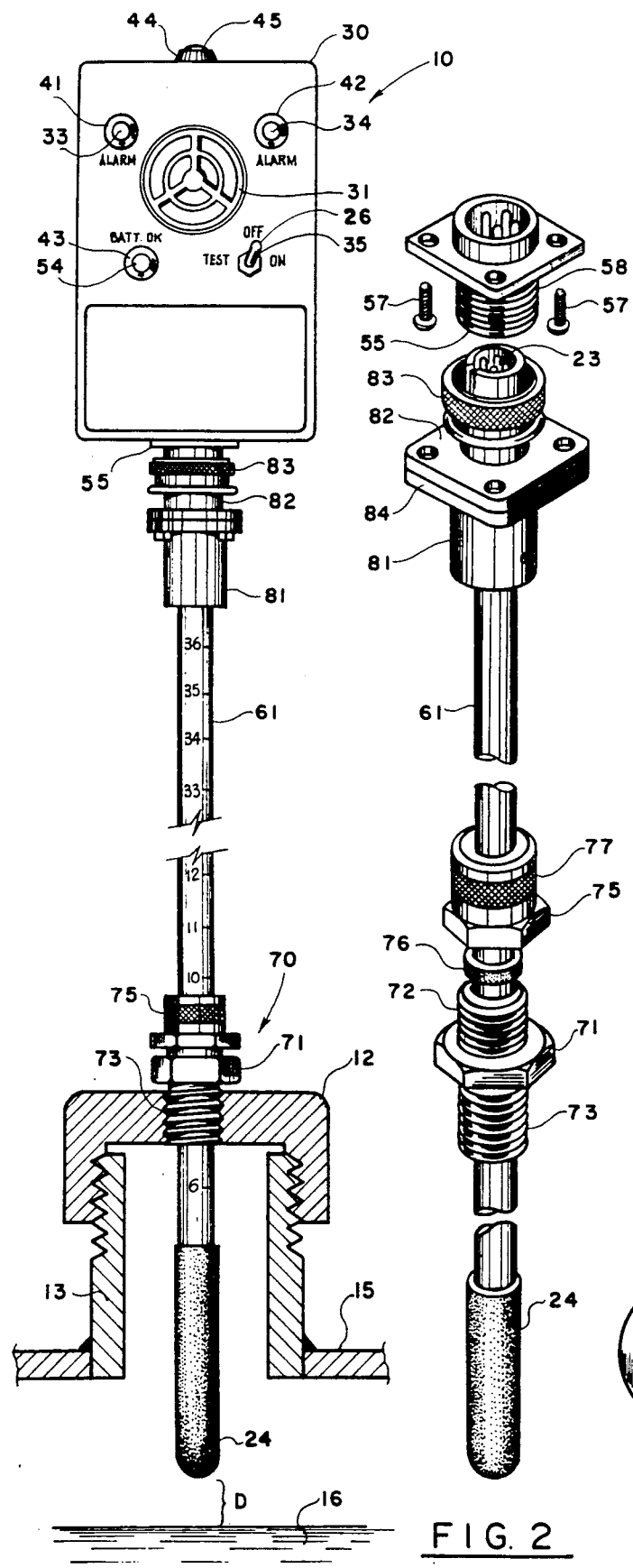
FIG. 1
FIG. 2
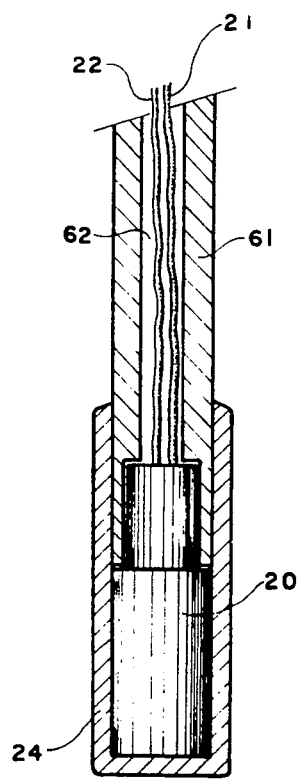
FIG. 3
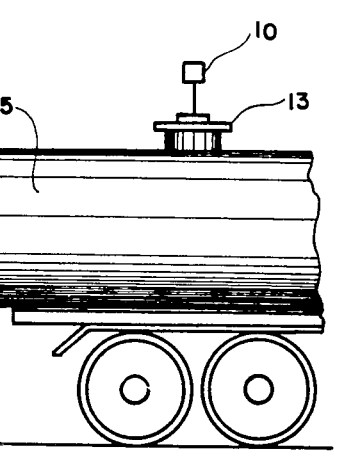
FIG. 7

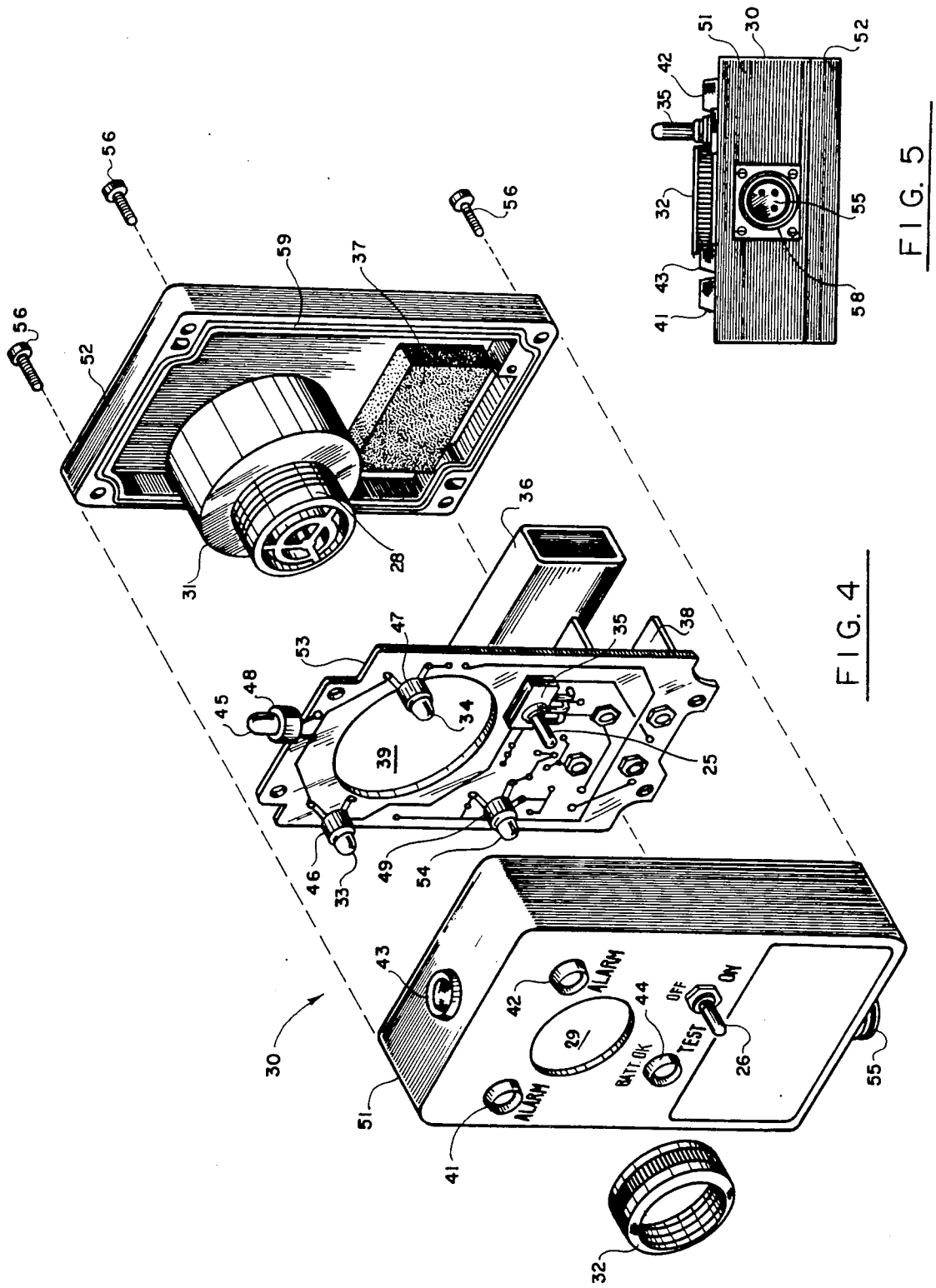

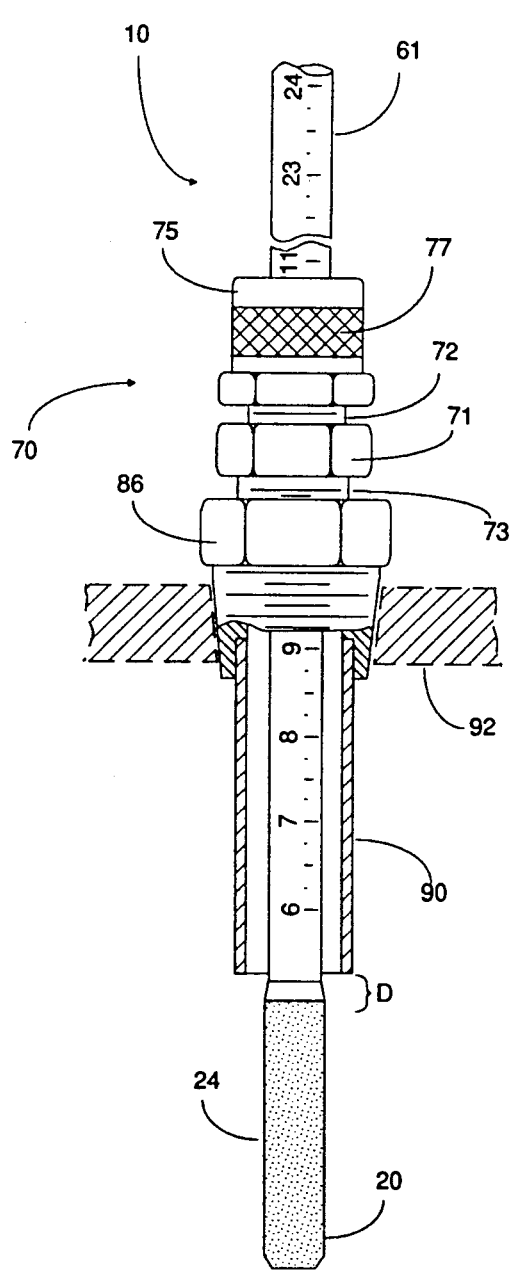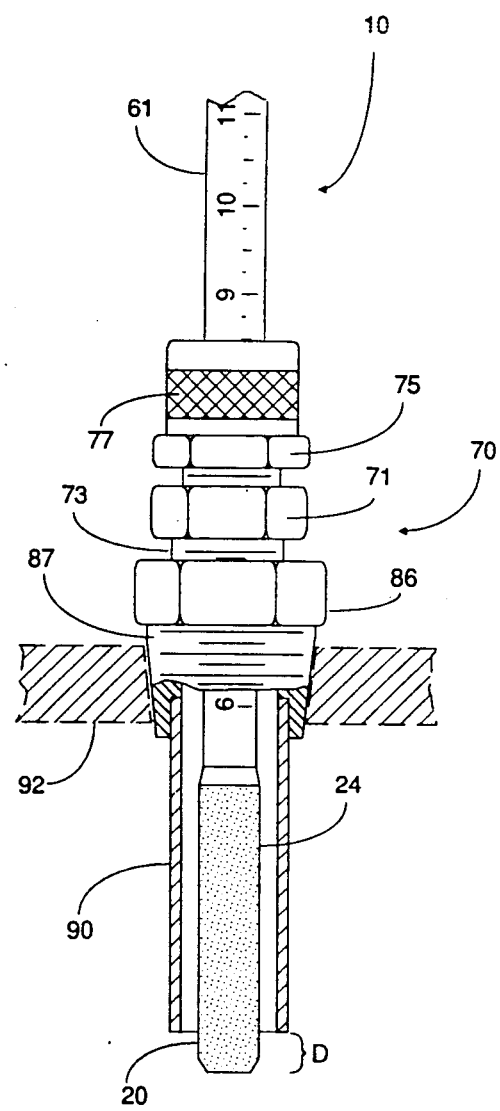
FIG. 8
FIG. 9

PORTABLE LEVEL SENSING APPARATUS

BACKGROUND OF THE INVENTION

1. Field of the Invention

The present invention relates generally to level sensing devices, and more particularly to devices for sensing the level of fluids in a container and reporting visually and audibly when a desired level is reached.

2. General Background of the Invention

Many spills of toxic chemicals and undesirable substances which pollute the environment and subject personnel to unnecessary chemical exposure are occasioned by human error. One of the most common forms of human error is the failure to detect that the liquid level in a tank being filled is immediately proximate to the overflow point of the tank.

Attempts have been made in the prior art to provide audible and visual alarms which provide an indication of the advent of an overflow condition in tanks. These systems, however, are complex and unduly expensive since they must in most cases be corrosion-resistant and spark-free due to the highly flammable and/or reactive nature of many liquids loaded in such tanks. Furthermore, alarm systems utilizing conventional sensing devices and which are hard-wired to a control center are unduly complex and subject to frequent failures because of the frequent mating of electrical connectors in a hostile environment.

SUMMARY OF THE INVENTION

The present invention comprises a portable level sensing apparatus which includes both an audible alarm means and a visual alarm means (preferably LEDs) for signalling when a predetermined level has been sensed by a proximity sensing capacitance device (preferably a capacitance proximity switch). The portable level sensing apparatus is designed for use in railroad tank cars, ships, barges, and tank trucks, and includes a graduated rod and a coupling means (preferably threaded) to allow one to quickly and easily set the capacitance proximity switch at the proper level in a tank. The coupling means is preferably pressure-tight to at least 150 p.s.i. to prevent the escape of fumes during use.

The portable level sensing apparatus includes a housing (which is preferably rigid and weather-tight) and is preferably intrinsically safe for use in hazardous area classifications Class I, Division 1, Groups A, B, C, & D. The housing contains electronic circuitry, and preferably also contains the alarm means and power supply means (such as a 9 volt alkaline battery).

The graduated rod is preferably made of a corrosion-resistant material, such as 316 stainless steel or Hastelloy C TM brand metal, to be able to withstand the corrosive effect of the fluids with which it will come into contact in tank cars, ships, barges, and tank trucks. The proximity sensing capacitance device is preferably housed in a material which is corrosion-resistant, such as polyethylene or polytetrafluoroethylene. The graduated rod is connected at a first end to the housing and at a second end to the capacitance device. The graduated rod is preferably hollow to allow electrical transmission means connecting the capacitance device to the housing to pass therethrough.

Preferably, a testing device is included which allows the capacitance device to be tested without withdrawing the capacitance device from the tank in which a fluid level is to be detected.

The graduated rod is preferably detachably connected to the housing using threaded coupling means.

The portable level sensing apparatus is preferably stand-alone and self-contained, but it may include remote coupling means for coupling the apparatus to a remote shut-down device.

The present invention provides a novel, low cost, simple, self-contained audible and visual alarm apparatus that has a minimum number of parts, has an adjustable insertion length, is powered by a long-life disposable battery, and in operation has optimum environmental capabilities regarding both the internal and external environments of the tank being filled. The extremely low power consumption makes this invention suitable for use in hazardous areas.

The present invention, because of its autonomy and low inherent cost, makes it practical to supply every loading facility in a manufacturing plant with an alarm system that is versatile and easily deployed without the requirement of complex installation or auxiliary systems.

BRIEF DESCRIPTION OF THE DRAWINGS

For a better understanding of the nature, objects, and advantages of the present invention, reference should be had to the following detailed description, taken in conjunction with the following drawings, in which like reference numerals denote like elements, and wherein:

FIG. 1 is a front view of the preferred embodiment of the present invention.

FIG. 2 is a perspective view of the connectors and fittings used in the preferred embodiment of the present invention.

FIG. 3 is a detail of the end of the rod adjacent and the capacitive sensor of the preferred embodiment of the present invention.

FIG. 4 is an exploded view of the housing and components therein of the preferred embodiment of the present invention.

FIG. 5 is a view of the underside of the housing of the preferred embodiment of the present invention.

FIG. 7 shows the apparatus of the present invention in use.

FIG. 8 is a detail of an alternative embodiment of the present invention in use.

FIG. 9 is a detail of the embodiment of FIG. 8 in the test mode.

PARTS LIST

Figure 6:
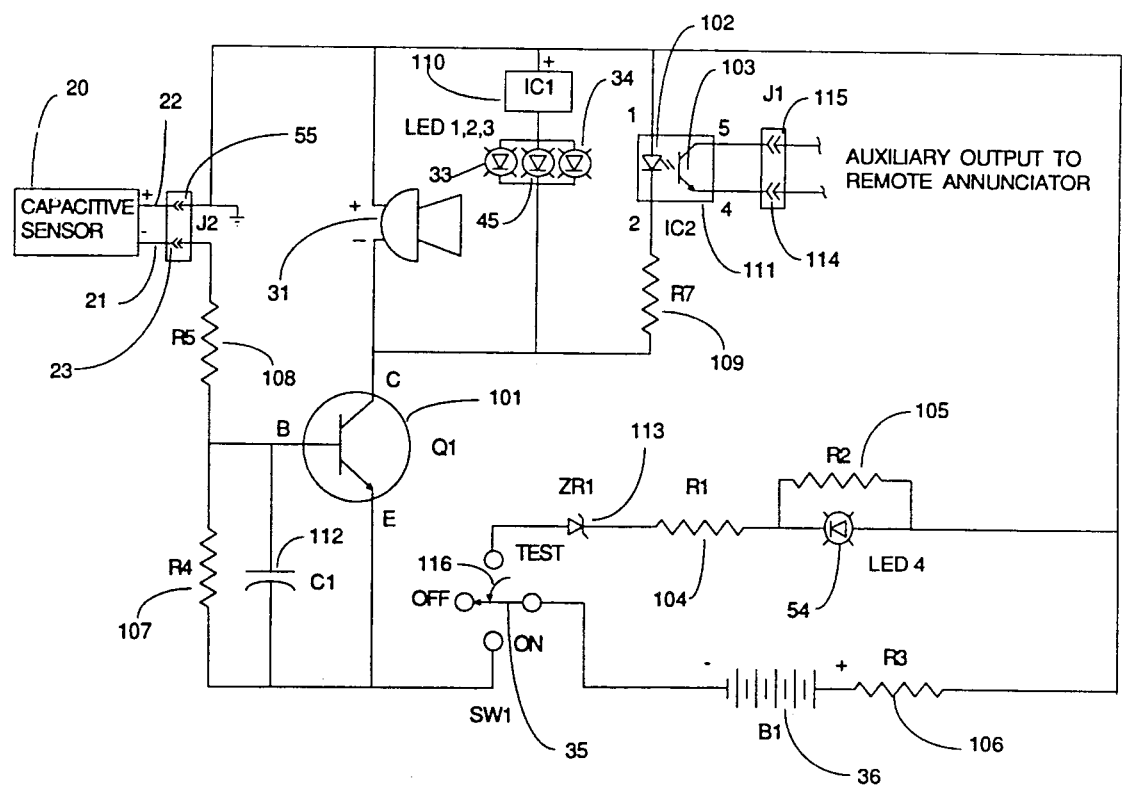
FIG. 6 is a diagram of the circuit of the preferred embodiment of the present invention.

The following is a list of suitable parts and materials for the various elements of the preferred embodiment of the present invention.

10 Portable level sensing apparatus
12 Tank cap with ½ inch internal threads
13 Inspection opening in tank 15
15 Fluid tank
16 Fluid in tank 15
Non-contact capacitance proximity sensor, Pepperl+Fuchs, Inc. type CJ4-12GK-N
21 Insulated wire
22 Insulated wire
23 Plug, Amphenol type 3108A-14S-02P
24 ⅝ inch OD sealing boot for capacitance sensor (polyethylene or polytetrafluoroethylene)

25 Toggle of switch 35
26 Weather-proof boot for toggle 25
28 Threaded portion of horn 31
29 Opening in front housing portion 51
30 Housing
31 Horn, Floyd Bell type AL-612-CPL
32 Horn-fastening hand nut (internally threaded)
33 Light-emitting diode (LED), ultra bright, 2000 MCD, red, T-1¾ size
34 Light-emitting diode (LED), ultra bright, 2000 MCD, red, T-1¾ size
35 Control switch, 3 position, single pole double throw momentary/off/on locking toggle, C&K 7107KZQE
36 9 Volt Alkaline Battery, type HS22, 522, 1604, or equivalent
37 Shock absorber (foam rubber)
38 Battery holder
39 Opening in PC board 53
41 LED protector
42 LED protector
43 LED protector
44 LED protector
45 Upper alarm LED, ultra bright, 2000 MCD, red, T-1¾ size
46 Sealing ring (rubber or plastic)
47 Sealing ring (rubber or plastic)
48 Sealing ring (rubber or plastic)
49 Sealing ring (rubber or plastic)
51 Front housing portion (Aluminum)
52 Rear housing portion (Aluminum)
53 Printed circuit (PC) board
54 Light-emitting diode (LED), green, diffused, T-1¾ size
55 Panel receptacle, Amphenol type 3102A-14s-02S
56 Screws
57 Screws '58 Threads
59 O-ring Seal
61 Hollow graduated rod (in inches) (316 stainless steel)
62 Bore of graduated rod 61
70 Sliding compression fitting
71 Connector with ½ inch pipe thread
72 ½ inch straight thread of connector 71
73 ½ inch pipe thread of connector 71
75 Nut with finger knurling
76 Ferrule (polytetrafluoroethylene)
77 Finger knurling of nut 75
81 Flanged adaptor
82 Flange
83 Knurled nut (internally threaded)
84 Flange of adaptor 81
86 Bushing, ¾ × ½ inch pipe thread
87 ¾ inch pipe thread of bushing 86
90 Stainless steel testing sleeve and protector
92 Tank cap with ¾ inch internal threads
101 Transistor, Type TIP-110
102 LED portion of opto-isolator 111
103 Transistor portion of opto-isolator 111
104 Resistor, 22 ohm, ¼ watt, 5%, carbon film
105 Resistor, 100 ohm, ¼ watt, 5%, carbon film
106 Resistor, 10 ohm, 10 watt, 5%, wirewound, polyethylene covered
107 Resistor, 470 ohm, ¼ watt, 5%, carbon film
108 Resistor, 220 ohm, ¼ watt, 5%, carbon film
109 Resistor, 2,000 ohm, ¼ watt, 5%, carbon film
110 Blinking LED, 1 Hz., T-1¾
Opto-isolator, Darlington, GE type H11G1
112 Capacitor, stacked metal film, 0.1 MF, 50 VDC, 5%
113 Zener diode, 4.3 V, 1 watt, 1N4731A
114 Panel receptacle, Switchcraft type QGP-3-63
115 Plug, Switchcraft type QGP-3-22
116 Spring

DETAILED DESCRIPTION OF THE PREFERRED EMBODIMENT

The apparatus of the preferred embodiment of the present invention, portable level sensing apparatus 10, includes both audible alarm means (horn 31) and visual alarm means (LEDs 33, 34, and 45) for signalling when a predetermined level has been sensed by non-contact proximity capacitance sensor 20. Portable level sensing apparatus 10 is designed for use in railroad tank cars, ships, barges, and tank trucks, and includes a graduated rod 61 and a threaded coupling means (sliding compression fitting 70, which includes connector 71, nut 75, and ferrule 76) to allow one to quickly and easily set proximity capacitance sensor 20 at the proper level in a tank. The coupling means is preferably pressure-tight to at least 150 p.s.i. to prevent the escape of fumes during use.

Portable level sensing apparatus 10 includes a weather-tight housing 30 and is intrinsically safe for use in hazardous area classifications Class I, Division 1, Groups A, B, C, & D. Housing 30 contains electronic circuitry (see FIG. 4 and the circuit diagram in FIG. 6), and also contains the alarm means (horn 31 and LEDs 33, 34, and 45) and power supply means (nine-volt alkaline battery 36). Housing 30 is preferably NEMA (National Electrical Manufacturers Association) approved. Graduated rod 61 is made of a corrosion- and solvent-resistant material, such as 316 stainless steel or Hastelloy C TM brand metal, to be able to withstand the corrosive effect of the fluids with which it will come into contact in tank cars, ships, barges, and tank trucks. Proximity capacitance sensor 20 is housed in ⅜ inch outside-diameter sealing boot 24 made of a material, such as polyethylene or polytetrafluoroethylene, which is corrosion-resistant and solvent-resistant. The outside diameter of boot 24 is so small to allow boot 24 to fit through relatively small openings in tank cars, ships, barges, and trucks. Graduated rod 61 is connected at a first end to housing 30 and at a second end to capacitance sensor 20. Graduated rod 61 has a bore 62 therein to allow electrical transmission means (insulated wires 21, 22—see FIGS. 3 and 6), connecting capacitance sensor 20 to housing 30, to pass therethrough.

Graduated rod 61 is detachably connected to housing 30 using threaded coupling means (receptacle 55 and plug 23). Receptacle 55 may be, for example, Amphenol type 3102A-14S-02S. Plug 23 may be, for example, Amphenol type 3108A-14S-02P. A flanged adaptor 81 has a flange 84 which connects with flange 82 of plug 23, and is positioned at a first end of graduated rod 61. Receptacle 55 is affixed to housing 30 with screws 57. Rod 61 is detachably connected to housing 30 by inserting plug 23 into receptacle 55 and screwing knurled nut 83 onto threads 58.

The gradations on rod 61 mark the distance from the lower tip of boot 24 plus ¼ inch. Depending upon the fluid 16 (see FIG. 1) in tank 15 (see FIGS. 1 and 7), the distance D (see FIG. 1) between the tip of boot 24 and the top of fluid 16 at which sensor 20 will sense fluid 16 varies from approximately ⅛ inch to ⅜ inch, with the distance D for a given fluid being constant. The distance D is taken into account when measuring the ullage (defined herein as the empty space) in tank 15. Fluid 16 can be, for example, a liquid, a powder, or even grain (in other words, anything that flows).

Housing 30 comprises a front housing portion 51 (see FIG. 4) and a rear housing portion 52, both housing portions preferably being made of a rigid, impact resistant material, such as aluminum. Present inside housing 30 is a printed circuit board 53 on which are mounted LEDs 33, 34, 45, and 54 and control switch 35. Horn 31 is also present inside housing 30, and extends through opening 39 in PC board 53. A threaded portion 28 of horn 31 extends through opening 29 in front housing portion 51. An internally threaded hand nut 32 screws onto threaded portion 28 of horn 31 to secure horn 31 in housing 30. Suitable sealing means (not shown) ensure that no air can pass through opening 29 when nut 32 is securely fastened onto threaded portion 28 of horn 31. Sealing rings 46, 47, 48, and 49 seal the opening between LEDs 33, 34, 45, and 54 and LED protectors 41, 42, 43, and 44, respectively, to ensure that housing 30 is weather-tight. A foam-rubber shock absorber 37 helps to prevent battery 36 from moving around in housing 30. Front housing portion 51 is secured to back housing portion 52 with screws 56. An 0-ring seal 59 causes the connection between portions 51 and 52 to be weather-tight.

A battery holder 38 is secured to the back of PC board 53; disposed in holder 38 is a nine-volt alkaline battery 36, the power supply means of apparatus 10.

Capacitive sensor 20 is preferably a non-contact capacitance proximity sensor, such as a Pepperl+Fuchs, Inc. type CJ4-12GK-N sensor. The type CJ4-12GK-N sensor works in the following manner. It acts similarly to a simple capacitor. One of the two metal plates is in the lower end of sensor 20 and is electrically connected to an oscillator (not shown). The object to be sensed (such as fluid 16) acts as the other plate of the capacitor. When power is applied to sensor 20, the oscillator senses the external capacitance between the target (such as fluid 16) and the internal sensor plate (not shown). This capacitance forms a part of the feedback capacitance in the oscillator circuit (not shown). When the feedback capacitance is sufficient, the oscillator begins oscillation. When the capacitance reaches a threshold (such as when sensor 20 is within a distance D of fluid 16), the trigger circuit (not shown) turns on a switching device (not shown) which allows full current to flow through sensor 20.

Battery 36 and a resistor 106 (R3) are connected in series with one another (see FIG. 6) to limit the current to a safe value should an electrical fault develop with the apparatus. When switch 35 (SW1) is in the "test" position, battery 36 and resistor 106 are connected in series with resistor 104 (R1), Zener diode 113 (ZR1), and LED 54 and shunted by resistor 105 (R2). LED 54 emits green light when battery 36 has sufficient charge (about six volts) to operate apparatus 10 and switch 35 is in the "test" position. Spring 116 returns switch 35 to the "off" position when toggle 25 is released.

When switch 35 is in the "on" position, battery 36 and resistor 106 are in series with capacitance sensor 20, resistor 108 (R5), and resistor 107 (R4). Resistors 107 and 108 act as a voltage divider to provide the necessary bias to transistor 10 (Q1). The alarm circuit comprises horn 31, LEDs 33, 34, and 45, and opto-isolator 111, with horn 31 and the input of opto-isolator 111 being connected in parallel with one another and with an integrated chip 110 (IC1) and LEDs 33, 34, and 45.

Resistor 109 limits current through opto-isolator 111. LEDs 33, 34, and 45 are connected in parallel with one another and in series with integrated chip 110 which causes LEDs 33, 34, and 45 to flash when current flows therethrough. The alarm circuit is connected to the positive pole of battery 36 through resistor 106 when switch 35 is in the "on" position, and to the negative pole of battery 36 via the collector C and emitter E of transistor 101. Normally, when switch 35 is in the "on" position, an electronic switch (not shown) in capacitance sensor 20 is open, preventing current flow therethrough. However, when capacitance sensor 20 comes within a predetermined distance D (see FIG. 1) of a fluid 16 (e.g, D is ¼" when fluid 16 is gasoline), the switch closes, allowing current to flow through sensor 20 and through resistors 108 and 107, turning on transistor 101 and allowing current to flow through the alarm circuit, causing horn 31 to sound, LEDs 33, 34, and 45 to light up and flash, and causing opto-isolator 111 to activate and send a signal to a remote annunciator or shutdown system that an alarm condition exists. Current continues to flow through resistors 108 and 107 until switch 35 is switched to the "off" position or until the distance between boot 24 and fluid 16 is greater than the distance D. Capacitor 112 serves to prevent transistor 101 from oscillating.

Opto-isolator 111 contains an LED 102 and a light-responsive transistor 103. Current flowing through LED 102 causes it to light, and the light from it causes transistor 103 to turn on, allowing current to flow from pin 5 to pin 4 of opto-isolator 111. The current flowing through pins 5 and 4 provides a signal to a remote annunciator or shutdown system that an alarm condition exists. This remote annunciator could, for example, sound an external horn, or automatically stop fluid 16 from flowing into tank 15. This remote annunciator or shutdown system can be connected to plug 115 which can be plugged into receptacle 114. Receptacle 114 can be located, for example, on the back of rear housing portion 52. Opto-isolator 111 and panel receptacle 114 are optional and may be omitted when there is no need or desire to hook up apparatus 10 to a remote annunciator.

To move switch 35 from the "on" position to the "off" position, toggle 25 (see FIG. 4) must be pulled outward. This feature helps to prevent apparatus 10 from accidentally being shut off.

Apparatus 10 is assembled as shown in FIGS. 2, 3, and 4. Flanged adaptor 81 and boot 24 serve, among other things, to prevent connector 71, ferrule 76, and nut 75 from sliding off of the end of rod 61. Either boot 24 or flanged adaptor 81 can be secured to the end of rod 61 after connector 71 is slid onto rod 61.

In operation, apparatus 10 is connected to a tank 15 by screwing thread 73 of connector 71 into the internal threads of cap 12 (see FIG. 1) adjacent the center of cap 12 (cap 12 is also threaded adjacent its perimeter and is itself screwed onto a threaded inspection opening 13 in tank 15). Rod 61 is slid up or down until the gradation corresponding to the desired distance of the tip of boot 24 from the tip of nut 75 is read on the gradations on rod 61. Nut 75 is then tightened, compressing ferrule 76 between it and connector 71, thereby providing an weather-tight connection and securing the tip of boot 24 in the proper position. Apparatus 10 is then turned on by moving toggle 25 of switch 35 to the "on" position. Tank 15 is then filled through a fill port (not shown). When fluid 16 comes within distance D of the tip of boot 24, capacitance sensor 20 senses fluid 16 and sets off the audible (horn 31) and visual (LEDs 33, 34, and 45) alarm (and the remote alarm system via opto-isolator 111, if included).

FIGS. 8 and 9 show an optional sleeve 90 which can serve as both a testing device and as a protective device to protect capacitive sensor 20 and boot 24 during transportation of apparatus 10. Sleeve 90 is useful for testing apparatus 10 when one wishes to leave apparatus 10, less housing 30, attached to a tank (which some plants like to do when the tanks in which apparatus 10 is used are pressurized, for example). Sleeve 90 is also useful for protecting sensor 20 and boot 24 during transportation of apparatus 10.

Threads 73 of connector 71, instead of being screwed into the internally threaded opening of cap 12, are instead screwed into the internal threads of bushing 86, which in turn is screwed, via threads 87, into an internally threaded opening in cap 92. Other than the fact that the internal threads of cap 92 are slightly larger (¾ inch) than those of cap 12 (½ inch), cap 92 is essentially identical to cap 12.

Sleeve 90 is press-fit into the lower end of bushing 86. Sleeve 90 acts both as a testing device and as a protective device, and may be made of any material which has a high dielectric and which preferably is relatively rigid, such as stainless steel. When the lower tip of sensor 20 is at least a distance D below the lower tip of sleeve 90, sleeve 90 is not detected by sensor 20 and does not affect its performance (see FIG. 8, where the lower tip of sensor 20 is relatively far below the lower tip of sleeve 90). On the other hand, when it is desired to test apparatus 10 without withdrawing sensor 20 from tank 15, nut 75 is loosened, and rod 61 is pulled upward until the alarm means (horn 31 and LEDs 33, 34, and 45, and opto-isolator 111) go off, indicating that the lower tip of sensor 20 is within a distance D of the lower tip of sleeve 90 (see FIG. 9). The distance from the top of nut 75 to the lower tip of sleeve 90 is known (in FIG. 9 it is about 8½ inches), so one can, by reading the distance indicated on the gradations above nut 75, determine if sensor 20 is properly detecting sleeve 90. By retracting the lower tip of sensor 20 into sleeve 90, a complete test of apparatus 10 is performed, from the operation of sensor 20 to the operation of LEDs 33, 34, and 45, horn 31, and opto-isolator 111, without withdrawing sensor 20 from tank 15.

When apparatus 10 is being transported, sensor 20 may optionally be withdrawn into sleeve 90 to help prevent boot 24, which is most preferably made of polytetrafluoroethylene (which is not very scratch-resistant), from getting scratched.

When only the testing feature of sleeve 90 is desired, and the protective feature of sleeve 90 is not necessary, sleeve 90 can be replaced, for example, by a pin welded onto the lower end of bushing 86 or any other thing which can be detected by sensor 20 without withdrawing sensor 20 from tank 15. The testing device could even comprise a bar welded or otherwise affixed to cap 92.

In view of the numerous modifications which could be made to the preferred embodiments described herein without departing from the spirit or scope of the present invention, the details herein are to be interpreted as illustrative and not in a limiting sense.

I claim:

1. Portable level sensing apparatus having a standby mode in which the apparatus is ready to detect a level and an active mode when the apparatus is detecting a level, the apparatus comprising:
   (a) a housing containing electronic circuitry;
   (b) a graduated rod having a first end and a second end and connected at its first end to the housing;
   (c) a proximity sensing capacitance device at the second end of the graduated rod, the proximity sensing capacitance device having means for detecting a liquid, when the proximity sensing capacitance device is at a predetermined distance from the liquid, without touching the liquid;
   (d) electrical transmission means connecting the capacitance device to the electronic circuitry in the housing;
   (e) visual alarm means electronically connected to the electronic circuitry for visually signalling when a predetermined level is detected;
   (f) audible alarm means electrically connected to the electronic circuitry for audibly signalling when a predetermined level is detected;
   (g) power supply means for powering the alarm means and the capacitance device; and
   (h) coupling means for coupling the rod to a tank of liquid.

2. The apparatus of claim 1, wherein:
the graduated rod is hollow.

3. The apparatus of claim 1, wherein:
the graduated rod is made of corrosion-resistant and solvent-resistant material.

4. The apparatus of claim 3, wherein:
the graduated rod is made of 316 stainless steel.

5. The apparatus of claim 3, wherein: the graduated rod is made of Hastelloy C TM brand metal.

6. The apparatus of claim 1, wherein:
the proximity sensing capacitance device is housed in a ⅜" OD tip of polyethylene.

7. The apparatus of claim 1, wherein:
the proximity sensing capacitance device is housed in a ⅜" OD tip of polytetrafluoroethylene.

8. The apparatus of claim 1, wherein:
the electrical transmission means are in the rod.

9. The apparatus of claim 1, wherein:
the visual alarm means are in the housing.

10. The apparatus of claim 1, wherein:
the power supply means is in the housing.

11. The apparatus of claim 1, wherein:
the coupling means comprises a compression fitting slidably affixed to the graduated rod.

12. The apparatus of claim 1, wherein:
the coupling means is pressure tight.

13. The apparatus of claim 1, wherein:
the coupling means is pressure tight to at least 150 p.s.i.

14. The apparatus of claim 1, further comprising:
connecting means for detachably connecting the rod to the housing.

15. The apparatus of claim 14, wherein:
the connecting means comprised threaded coupling means.

16. The apparatus of claim 1, wherein:
the apparatus is self-contained.

17. The apparatus of claim 1, further comprising:
remote coupling means for coupling the apparatus to a remote alarm or shut-down device.

18. The apparatus of claim 1, further comprising:
testing means detectable by the capacitance device for testing the capacitance device.

19. The apparatus of claim 1, wherein:

the audible alarm means are in the housing.

20. Portable level sensing apparatus having a standby mode in which the apparatus is ready to detect a level and an active mode when the apparatus is detecting a level, the apparatus comprising:
   (a) a housing containing electronic circuitry;
   (b) a graduated rod having a first end and a second end and connected at its first end to the housing;
   (c) a proximity sensing capacitance device at the second end of the graduated rod;
   (d) electrical transmission means connecting the capacitance device to the electronic circuitry in the housing;
   (e) visual alarm means electrically connected to the electronic circuitry for visually signalling when a predetermined level is detected;
   (f) audible alarm means electrically connected to the electronic circuitry for audibly signalling when a predetermined level is detected;
   (g) power supply means for powering the alarm means and the capacitance device;
   (h) coupling means for coupling the rod to a tank of fluid; and
   (i) testing means detectable by the capacitance device for testing the capacitance device, wherein:
   the testing means comprises a cylindrical sleeve attached to the coupling means.

21. Portable level sensing apparatus having a standby mode in which the apparatus is ready to detect a level and an active mode when the apparatus is detecting a level, the apparatus comprising:
   (a) a housing containing electronic circuitry;
   (b) a hollow, graduated rod made of 316 stainless steel and having a first end and a second end and connected at its first end to the housing;
   (c) a proximity sensing capacitance device at the second end of the graduated rod and housed in a ⅜" OD tip of polyethylene or polytetrafluoroethylene, the proximity sensing capacitance device having means for detecting a liquid, when the proximity sensing capacitance device is at a predetermined distance from the liquid, without touching the liquid;
   (d) electrical transmission means in the hollow rod connecting the capacitance device to the electronic circuitry in the housing;
   (e) visual alarm means, in the housing, electrically connected to the electronic circuitry for visually signalling when a predetermined level is detected;
   (f) audible alarm means, in the housing, electrically connected to the electronic circuitry for audibly signalling when a predetermined level is detected;
   (g) power supply means, in the housing, for powering the alarm means and the capacitance device; and
   (h) coupling means for coupling the rod to a tank of liquid, the coupling means comprising a compression fitting slidably affixed to the graduated rod.

22. Portable level sensing apparatus having a standby mode in which the apparatus is ready to detect a level and an active mode when the apparatus is detecting a level, the apparatus comprising:
   (a) a housing containing electronic circuitry;
   (b) a graduated rod having a first end and a second end and connected at its first end to the housing;
   (c) a proximity sensing capacitance device at the second end of the graduated rod, the proximity sensing capacitance device having means for detecting a liquid, when the proximity sensing capacitance device is at a predetermined distance from the liquid, without touching the liquid;
   (d) electrical transmission means connecting the capacitance device to the electronic circuitry in the housing;
   (e) visual alarm means electrically connected to the electronic circuitry for audibly signalling when a predetermined level is detected;
   (f) audible alarm means electrically connected to the electronic circuitry for audibly signalling when a predetermined level is detected;
   (g) power supply means for powering the alarm means and the capacitance device;
   (h) coupling means for coupling the rod to a tank of fluid; and
   (i) testing means detectable by the capacitance device for testing the capacitance device.

23. Portable level sensing apparatus having a standby mode in which the apparatus is ready to detect a level and an active mode when the apparatus is detecting a level, the apparatus comprising:
   (a) a housing containing electronic circuitry;
   (b) a graduated rod having a first end and a second end and connected at its first end to the housing;
   (c) a proximity sensing capacitance device at the second end of the graduated rod;
   (d) electrical transmission means connecting the capacitance device to the electronic circuitry in the housing;
   (e) visual alarm means electrically connected to the electronic circuitry for visually signalling when a predetermined level is detected;
   (f) audible alarm means electrically connected to the electronic circuitry for audibly signalling when a predetermined level is detected;
   (g) power supply means for powering the alarm means and the capacitance device;
   (h) coupling means for coupling the rod to a tank of fluid; and
   (i) testing means detectable by the capacitance device for testing the capacitance device, wherein:
   the testing means comprises a sleeve attached to the coupling means.

* * * * *